United States Patent
Saneyoshi et al.

(10) Patent No.: US 8,444,316 B2
(45) Date of Patent: May 21, 2013

(54) TEMPERATURE MEASURING DEVICE AND METHOD

(75) Inventors: Eisuke Saneyoshi, Tokyo (JP); Koichi Nose, Tokyo (JP); Mikihiro Kajita, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 12/746,947

(22) PCT Filed: Nov. 27, 2008

(86) PCT No.: PCT/JP2008/071549
§ 371 (c)(1), (2), (4) Date: Jun. 9, 2010

(87) PCT Pub. No.: WO2009/084352
PCT Pub. Date: Jul. 9, 2009

(65) Prior Publication Data
US 2010/0272149 A1 Oct. 28, 2010

(30) Foreign Application Priority Data
Dec. 28, 2007 (JP) .................. 2007-340361

(51) Int. Cl.
*G01K 13/00* (2006.01)
(52) U.S. Cl.
USPC .......................................... 374/152; 374/163
(58) Field of Classification Search
USPC .......................................... 374/152, 163, 170
See application file for complete search history.

(56) References Cited

U.S. PATENT DOCUMENTS

| | | | | |
|---|---|---|---|---|
| 3,768,310 A | * | 10/1973 | Krepak | 374/170 |
| 5,638,418 A | * | 6/1997 | Douglass et al. | 377/25 |
| 2006/0088078 A1 | * | 4/2006 | Gerhart et al. | 374/152 |
| 2008/0144415 A1 | * | 6/2008 | Macerola et al. | 365/211 |
| 2010/0040111 A1 | * | 2/2010 | Cheng et al. | 374/170 |

FOREIGN PATENT DOCUMENTS

| | | |
|---|---|---|
| JP | 2-147828 A | 6/1990 |
| JP | 2004219410 A | 8/2004 |
| JP | 2004281985 A | 10/2004 |
| JP | 2006284244 A | 10/2006 |
| JP | 2007047177 A | 2/2007 |
| JP | 2007067275 A | 3/2007 |
| JP | 2007281139 A | 10/2007 |
| JP | 2007317684 A | 12/2007 |

OTHER PUBLICATIONS

International Search Report for PCT/JP2008/071549 mailed Mar. 3, 2009.
M. A. P. Pertijs et al., "Precision Temperature Measurement Using CMOS Substrate PNP Transistors", IEEE Sensors Journal, vol. 4, No. 3, Jun. 2004, pp. 294-300.
M. A. P. Pertijs et al., "Precision Temperature Measurement Using CMOS Substrate PNP Transistors", IEEE Sensors Journal, vol. 4, No. 3, Jun. 2004, pp. 294-300.
W. Liao et al., "Temperature and Supply Voltage Aware Performance and Power Modeling at Microarchitecture Level", IEEE Transactions on Computer-Aided Design of Integrated Circuits and Systems, vol. 24, No. 7, Jul. 2005, pp. 1042-1053.

* cited by examiner

*Primary Examiner* — Christopher Fulton

(57) ABSTRACT

Current reading means detects an output current of a current source whose output current varies with a variation in temperature and outputs a value proportional to the output current. The temperature of the current source corresponding to the output value of the current reading means which is proportional to the output current of the current source is measured, and a parameter for converting the output value to temperature information is determined from the output value of the current reading means and the measured value of the temperature of the current source corresponding to the output value. The output value of the current reading means is converted to the temperature information using the determined parameter.

19 Claims, 1 Drawing Sheet

TEMPERATURE MEASURING DEVICE AND METHOD

The present application is the National Phase of PCT/JP2008/071549, filed Nov. 27, 2008, which claims priority based on Japanese Patent Application No. 2007-340361, filed on Dec. 28, 2007, the disclosure of which is incorporated herein by reference in its entirety.

TECHNICAL FIELD

The present invention relates to a temperature measuring device for measuring temperature of a semiconductor device and a method thereof.

BACKGROUND ART

With the development of technologies in recent years, downsizing and high density mounting of semiconductor devices are underway, and heat, generated when such semiconductor devices are operated, is becoming problematic. When semiconductor devices become hot due to heat generation, performance deterioration and thermal destruction or the like may be more likely to occur, and therefore a technique for preventing such a problem is required.

Examples of techniques for preventing performance deterioration and thermal destruction or the like include a method of detecting temperature of a semiconductor device using a temperature measuring device and changing the operation of the semiconductor device to a power-saving mode when the temperature exceeds a predetermined temperature, a method of controlling performance of a cooling device for cooling a semiconductor device according to the temperature of the semiconductor device or a method combining those methods.

Configurations of a temperature measuring device are described, for example, in Japanese Laid-Open Patent Application No. 2007-281139A (hereinafter referred to as "Patent Document 1"), Japanese Laid-Open Patent Application No. 2004-219410A (hereinafter referred to as "Patent Document 2") and Japanese Laid-Open Patent Application No. 2007-067275A (hereinafter referred to as "Patent Document 3"). Patent Documents 1 to 3 describe configuration examples of temperature measuring device using a semiconductor device whose characteristics vary depending on temperature and which is used as a temperature sensor.

Patent Document 1 describes a temperature control system which saves an output value (set value) of a temperature detecting section corresponding to a predetermined set temperature beforehand and starts a cooling operation when the output value of the temperature detecting section exceeds the set value.

Furthermore, Patent Document 2 describes a configuration which creates a lookup table that associates output values of a temperature sensor with absolute temperatures beforehand and converts an output value of the temperature sensor to information on an absolute temperature by looking up the lookup table.

Patent Document 3 describes a configuration which creates a plurality of temperature sensors having different threshold voltage temperature characteristics using a known temperature characteristic of a semiconductor device used as a temperature sensor, compares an output value of each temperature sensor with a reference voltage and thereby acquires information on an absolute temperature.

However, the temperature measuring devices disclosed in above described Patent Documents 1 to 3 have the following problems.

Since the temperature measuring device described in Patent Document 1 adopts a configuration which determines whether or not the output value of the temperature detecting section has exceeded a set value, it is necessary to sweep the set value to obtain an absolute temperature. Therefore, the circuit scale necessary to obtain the absolute temperature increases and the processing procedure also becomes more complicated.

The temperature measuring device described in Patent Document 2 converts the output value of a temperature sensor to an absolute temperature by looking up the lookup table, and therefore an absolute temperature corresponding to the output value of a temperature sensor that is not stored in the lookup table cannot be obtained. Furthermore, since a large amount of data needs to be stored in the lookup table to detect absolute temperatures with high definition, the amount of memory capacity that is provided with the lookup table need to be increases. There can also be a method which reduces information stored in the lookup table by calculating a corresponding absolute temperature from the output value of a temperature sensor not found in the lookup table using a linear equation or non-linear equation. However, the accuracy of a conversion expression for converting the output value of the temperature sensor to the absolute temperature becomes problematic and an accurate temperature can not always be detected.

The temperature measuring device described in Patent Document 3 determines parameters of each semiconductor device used as a temperature sensor based on a known temperature characteristic, but a variation in the characteristic of the semiconductor device, caused by the manufacturing process, is not taken into consideration. Therefore, there is a problem in that the measuring accuracy varies.

SUMMARY

It is therefore an object of the present invention to provide a temperature measuring device and a temperature measuring method capable of measuring the absolute temperature of a semiconductor device relatively accurately and easily without the need to take into consideration variations in the characteristics of the semiconductor devise caused by the manufacturing process.

In an aspect of the present invention for achieving the above-described object, the exemplary aspect of the temperature measuring device according to the present invention includes a current source whose output current varies with a variation in temperature, current reading means that detect the output current of the current source and that output a value proportional to the output current, parameter determining means that determine a parameter for converting the output value of the current reading means to temperature information, temperature converting means that convert the output value of the current reading means to temperature information using the parameter, and reference temperature measuring means that measure a temperature of the current source corresponding to the output value of the current reading means to be used to determine the parameter.

On the other hand, the exemplary aspect of the temperature measuring method of the present invention includes detecting an output current of a current source whose output current varies with a variation in temperature, outputting a value proportional to the output current, measuring a temperature of the current source corresponding to the output value proportional to the output current, determining a parameter for converting the output value to temperature information from the output value and the measured value of the temperature of the current source corresponding to the output value, and converting the output value to temperature information using the parameter.

EXEMPLARY EMBODIMENT

Next, the present invention will be described with reference to the accompanying drawings.

Figure 1:
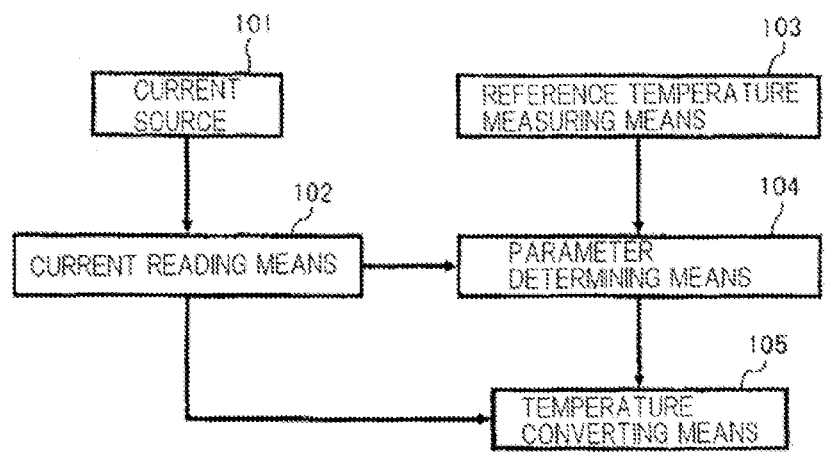
FIG. 1 is a block diagram illustrating a configuration example of a temperature measuring device according to the present invention.

FIG. 1 is a block diagram illustrating a configuration example of a temperature measuring device according to the present invention.

As shown in FIG. 1, the temperature measuring device of the present exemplary embodiment has a configuration including current source 101, current reading means 102, reference temperature measuring means 103, parameter determining means 104 and temperature converting means 105.

Current source 101 is made up of a semiconductor device whose output current varies with a variation in temperature. Current source 101 is used as a temperature sensor that detects the temperature of the semiconductor device to be monitored.

Current reading means 102 detects the output current of current source 101 and outputs the detected current value, a value proportional to the detected current value or information corresponding to the detected current value. Current reading means 102 preferably outputs the detection result of the output current of current source 101 in a digital value. Outputting the detection result in a digital value allows influences of resistance, inductance, capacitance or the like provided in wiring or the like to be reduced, and thereby allows current reading means 102 to output a more accurate detection result.

Temperature converting means 105 converts the output value of current reading means 102 to temperature information indicating an absolute temperature.

Reference temperature measuring means 103 measures a temperature of current source 101: Reference temperature measuring means 103 may be configured using, for example, a well known temperature diode. A temperature detecting circuit using a temperature diode is described in detail, for example, in Michiel A. P. Pertijs, Gerard C. M. Meijer, Johan H. Huijsing, "Precision temperature measurement using CMOS substrate pnp trans 1 stors," IEEE Sensors Journal, Volume 4, No 3, June 2004, page 294-300. When the above described temperature detecting circuit is used as reference temperature measuring means 103, reference temperature measuring means 103 is preferably disposed in the vicinity of current source 101. Since the temperature measuring device of the present exemplary embodiment detects an absolute temperature taking advantage of the fact that the output current of current source 101 depends on temperature, if reference temperature measuring means 103 is disposed in the vicinity of current source 101, the temperature of current source 101 can be measured substantially accurately.

Parameter determining means 104 determines a parameter for converting the output value of current reading means 102 to an absolute temperature using the output value of current reading means 102 and the temperature measured by reference temperature measuring means 103. By determining a parameter using a measured temperature value in this way, it is possible to determine the parameter including information on a variation in characteristics of the semiconductor device caused by a manufacturing process.

Reference temperature measuring means 103 and parameter determining means 104 are used when determining or updating a parameter but are not used for normal temperature measurement.

When a parameter is determined by parameter determining means 104, the parameter is stored in temperature converting means 105 and is used in processing to convert the output value of current reading means 102 to an absolute temperature by temperature converting means 105.

Since reference temperature measuring means 103 is intended to be used only when determining or updating a parameter as described above, the temperature of current source 101 may be measured, for example, by an operator using a known thermometer or the like instead of the above described temperature detecting circuit. In that case, the operator may input the temperature measurement result to parameter determining means 104 using an input device (not shown).

Parameter determining means 104 and temperature converting means 105 can be realized by combining a CPU, DSP or logic circuit or the like that operates according to a program.

Current source 101 used as a temperature sensor can be configured using, for example, a transistor. In such a case, an off-leakage current of a transistor may be used for the current that varies with a variation in temperature.

Furthermore, if, for example, a plurality of transistors of different sizes are prepared as current source 101 and a transistor is caused to be arbitrarily selected from among those transistors using a selector or the like, the amount of output current of current source 101 can be adjusted. Furthermore, if a plurality of transistors of the same size are prepared as current source 101 and an arbitrary number of transistors are caused to be selected from among those transistors using a selector or the like, the amount of output current of current source 101 can be adjusted. Furthermore, these configurations may be combined for current source 101. The size of the transistor may be changed by changing the gate width. Thus, by adjusting the amount of output current of current source 101, it is possible to adjust a variation in current with respect to a variation in temperature, and a temperature measuring device having a desired temperature resolution or a dynamic range can be obtained.

For current reading means 102, it is possible to adopt a configuration in which the amount of current outputted from current source 101 is converted to time information proportional to the amount of current and a time width thereof is read using a counter or the like. In this case, if the frequency of a clock supplied to the counter is changed, it is possible to adjust temperature resolution or dynamic range.

A plurality of temperature measuring devices of the present exemplary embodiment may also be provided in the same semiconductor chip. In such a case, reference temperature measuring means 103, parameter determining means 104 and temperature converting means 105 may be shared among the respective temperature measuring devices. When a plurality of temperature measuring devices are arranged in the same semiconductor chip, current sources 101 provided in the respective temperature measuring devices have substantially the same characteristic, and therefore the same parameter can be used commonly.

Exemplary Embodiment

Next, an exemplary embodiment of the present invention will be described using the accompanying drawings.

The present exemplary embodiment will illustrate a specific example of current source 101 and current reading means 102 shown in FIG. 1.

Figure 2:
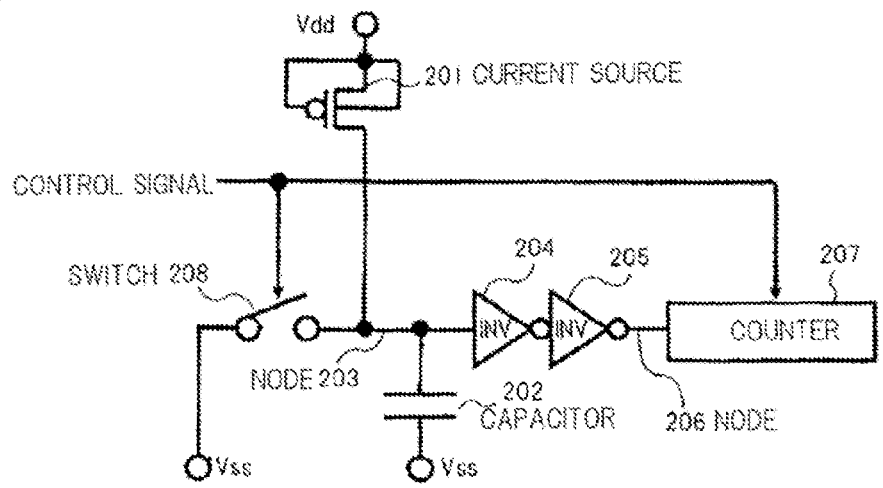
FIG. 2 is a circuit diagram illustrating a configuration of an exemplary embodiment of the current source and current reading means shown in FIG. 1.

FIG. 2 is a circuit diagram illustrating a configuration of the exemplary embodiment of the current source and current reading means shown in FIG. 1.

As shown in FIG. 2, current reading means 102 of the present exemplary embodiment has a configuration provided with capacitor 202, inverters 204 and 205, counter 207 and switch 208. Furthermore, current source 201 of the present exemplary embodiment is provided with a pMOS transistor and off-leakage current Ioff of the pMOS transistor is assumed to be an output current of current source 201.

This off-leakage current Ioff can be accurately expressed by a function using temperature T and two types of parameters A and B and is generally known to be expressed by following approximate expression (1).

$$Ioff = A \exp(BT) \quad (1)$$

By charging capacitor 202 with off-leakage current Ioff outputted from current source 201, off-leakage current Ioff is converted to a signal that includes time information. Here, charging time Time of capacitor 202 can be expressed by following expression (2) assuming that the charging voltage of capacitor 202 is a Vcharge.

$$Time = C \times Vcharge / Ioff \quad (2)$$

Charging voltage Vcharge of capacitor 202 is inputted to inverter 204.

Inverters 204 and 205 invert the output signal when the charging voltage Vcharge of capacitor 202 reaches predetermined threshold voltage Vth (Vcharge=Vth). That is, a pulse signal having the same width as that of charging time Time of capacitor 202 is obtained from the output of inverter 205.

The width W of this pulse signal is expressed by:

$$W = A' \exp(-BT) \quad (3)$$

according to expressions (1) and (2) above, where:

$$A' = C \times Vth / A \quad (4)$$

Counter 207 counts width W of the pulse signal using a clock supplied from the outside and outputs time information corresponding to off-leakage current Ioff as a count value.

Switch 208 is intended to control the charging/discharging operation of capacitor 202, and when switch 208 is OFF, capacitor 202 charges at off-leakage current Ioff and when switch 208 is ON, capacitor 202 discharges the stored electric charge. Operations of switch 208 and counter 207 are controlled by a control signal supplied from the outside.

Figure 3:
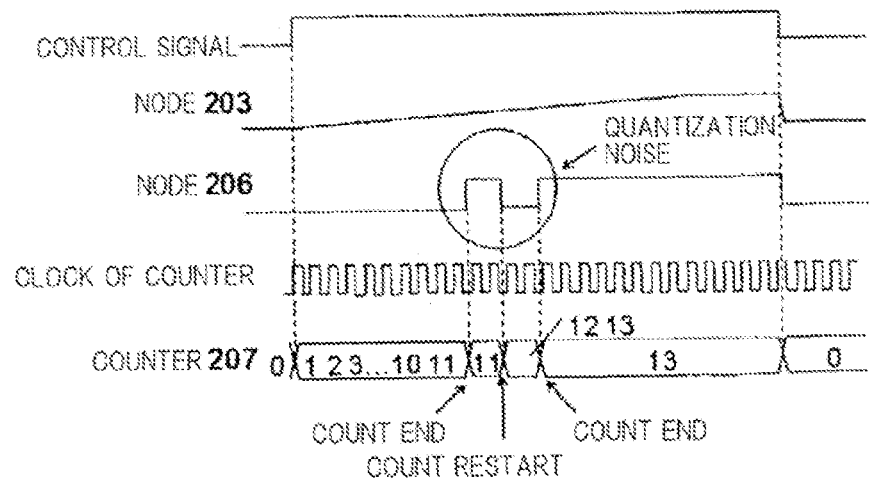
FIG. 3 is a timing chart illustrating operation of the current source and current reading means shown in FIG. 2.

FIG. 3 shows signal waveforms of the current source and current reading means shown in FIG. 2 at their respective nodes.

FIG. 3 is a timing chart illustrating operations of the current source and current reading means shown in FIG. 2.

When temperature measurement is not in progress, switch 208 is turned ON by a control signal. In this case, node 203 (output of capacitor 202) is connected to a low potential source (Vss) and the output voltage of capacitor 202 becomes VSS. In this case, inverter 204 outputs a high level and inverter 205 outputs a low level.

When temperature measurement starts, switch 208 is turned OFF by control signal 209 and capacitor 202 starts charging with off-leakage current Ioff outputted from current source 201. When the voltage of node 203 reaches threshold voltage Vth of inverter 204, the output signals of inverters 204 and 205 are inverted and the potential of node 206 (output of inverter 205) becomes high. Counter 207 counts time after switch 208 is turned OFF until the potential of node 206 is inverted.

In this case, as shown in FIG. 3, although the potential of node 206 may flutter due to quantization noise, counter 207 of the present exemplary embodiment executes count operation for the entire period during which the potential of node 206 is low.

After completion of counting, when control signal 209 causes switch 208 to turn ON, the electric charge stored in capacitor 202 is discharged and the count value of counter 207 is reset to an initial value.

In the present exemplary embodiment, a temperature-dependent output value formulated through the above described processing is obtained from counter 207.

Output value OUT (=W) of counter 207 and temperature T are expressed by expression (3) above as:

$$OUT = A' \exp(-BT) \quad (5)$$

Here, parameter "B" is a device parameter of the pMOS transistor used for current source 201 and can be calculated by measuring the characteristics beforehand. Depending on the structure of the pMOS transistor, the value of device parameter (parameter) "B" may differ from one transistor to another. However, even in such a case, the value of parameter "B" is uniquely determined for each output value OUT at arbitrary temperature T and it is the nature of parameter "B" of the transistor to remain unchanged even if temperature T changes. Therefore, when the characteristic of the pMOS transistor is measured beforehand and if a conversion expression or a conversion table for conversion from output value OUT of counter 207 to the value of parameter "B" is prepared, the value of parameter "B" can be determined from output value OUT of counter 207.

Therefore, when the current source and current reading means shown in FIG. 2 are used as a temperature measuring device, parameter "A'" can be determined once the output value of counter 207 at an arbitrary temperature is acquired. That is, parameter determining means 104 measures temperature using reference measuring means 103 shown in FIG. 1, for example, at room temperature and acquires the output value of counter 207 corresponding to the temperature, and can thereby determine parameter "A'."

When parameter "A'" is obtained, temperature converting means 105 can calculate absolute temperature T from output value OUT of counter 207 using expression (5) above from then on.

In the present exemplary embodiment, it is one parameter (parameter "A'") that is determined by parameter determining means 104 and a parameter including information on a variation in characteristics involved in the manufacturing step can be determined by only measuring the temperature once. Therefore, it is not necessary to measure temperature characteristics of the temperature measuring device using a thermostat or the like.

FIG. 2 shows an example where a pMOS transistor whose source is connected to a high potential source (Vdd) is used as current source 201, but an nMOS transistor whose source is connected to a low potential source (Vss) can be used as current source 201. In that case, the other input end that is provided in switch 208 and that is not connected to capacitor 202 may be connected to the high potential source (Vdd). Furthermore, capacitor 202 may be connected between node 203 and the high potential source (Vdd).

Furthermore, a parasitic capacitance of node 203 can also be used for capacitor 202.

Furthermore, FIG. 2 shows the configuration in which the count operation by counter 207 is stopped when charging voltage Vcharge of capacitor 202 exceeds threshold voltage Vth of inverter 204, but the configuration may be such that a comparator is provided instead of inverter 204 and the count operation by counter 207 is stopped when charging voltage Vcharge exceeds the reference voltage inputted to the comparator.

Furthermore, if a comparator that compares the output value of counter 207 with a predetermined set value is provided in addition to the configuration shown in FIG. 2, it is possible to obtain a judgment result with respect to whether or not the output of the comparator has exceeded a desired temperature.

Furthermore, a plurality of the current sources and current reading means shown in FIG. 2 may be provided in the same semiconductor chip. In that case, counter 207 and the comparator that compares the output value of counter 207 with the set value may be provided in each temperature measuring device, and if the output signal of inverter 205 provided in each temperature measuring device is selected using a selector or the like, counter 207 and the comparator can be shared among the respective temperature measuring devices.

According to the present invention, temperature can be measured with high accuracy by determining a parameter indicating a relationship between the output value of current reading means 102 and temperature. Furthermore, since the parameter includes information on a variation in characteristics caused by the manufacturing process, it is not necessary to take into consideration manufacturing variation during circuit design. Furthermore, since it is one parameter that is determined, measurement necessary to determine the parameter also needs to be performed only once for each temperature measuring device at room temperature.

Therefore, it is possible to measure the absolute temperature of the semiconductor device relatively accurately and easily without the need to take into consideration variation in the characteristics of the semiconductor device caused by the manufacturing process.

Although a case has been described above where output value OUT(=W) of counter 207 and temperature T have the relationship shown by expression (5), the present invention is also applicable to a case where output value OUT (=W) of counter 207 and temperature T do not follow the function shown by expression (5) above if temperature is measured using an off-leakage current of the transistor as described above, if two parameters ("A'", "B") are used to calculate an absolute temperature, and further if the value of parameter "B" is uniquely determined by output value OUT of counter 207 at arbitrary temperature T and if the transistor has the nature that the value of parameter "B" does not vary even if temperature T varies.

For example, according to the description of Weiping Liao, Lei He, Kevin M. Lepak, "Temperature and Supply Voltage Aware Performance and Power Modeling at Microarchitecture Level," IEEE Transactions on Computer-Aided Design of Integrated Circuits and Systems, Vol. 24, No. 7, pp. 1042-1053, July, 2005, output value OUT (=W) of counter 207 and temperature T can be expressed as:

$$OUT = AT^2 \exp(B/T) \quad (6)$$

However, even in this expression (6), the value of parameter "B" is a value uniquely determined by output value OUT of counter 207 at arbitrary temperature T, and therefore two parameters "A'" and "B" can be determined as described above.

Furthermore, even in the case where it is difficult to predict the value of parameter "B," if output value OUT of counter 207 is measured at first temperature T1 (suppose the value in this case is OUT1) taking advantage of the fact that there are two parameters and that the value of output value OUT of counter 207 is measured at second temperature T2 (suppose the value in this case is OUT2), it is possible to uniquely determine the values of parameters "B" and "A'."

The present invention has been described with reference to an exemplary embodiment so far, but the present invention is not limited to the above described exemplary embodiment. Various modifications to details and the configuration of the present invention that are understandable to those skilled in the art can be made within the scope of the present invention.

The invention claimed is:

1. A temperature measuring device comprising:
 a current source whose output current varies with a variation in temperature;
 current reading means that detect the output current of the current source and that output a value proportional to the output current;
 parameter determining means that determine a parameter for converting the output value of said current reading means to temperature information;
 temperature converting means that convert the output value of said current reading means to temperature information using said parameter; and
 reference temperature measuring means that measure a temperature of said current source corresponding to the output value of said current reading means to be used to determine said parameter,
 wherein said parameter determining means determines said parameter using the output value of said current reading means and the temperature measured by said reference temperature measuring means.

2. The temperature measuring device according to claim 1, wherein
 said current source comprises a transistor, and
 the output current of said current source is an off-leakage current of said transistor.

3. The temperature measuring device according to claim 2, wherein said parameter determining means converts the output value of said current reading means to temperature information using two types of parameter.

4. The temperature measuring device according to claim 3, wherein said parameter determining means calculates A' and B as said parameters that satisfy a relationship:

$$OUT = A' \exp(-BT)$$

where the output value of said current reading means is assumed to be OUT and the temperature of said current source measured by said reference temperature measuring means is assumed to be T.

5. The temperature measuring device according to claim 4, wherein said parameter determining means determines parameters A' and B from a first output value of said current reading means at a first temperature and a second output value of said current reading means at a second temperature using an expression indicating a relationship between output value OUT of said current reading means and temperature T of said current source measured by said reference temperature measuring means.

6. The temperature measuring device according to claim 2, wherein said current reading means converts the output current of said current source to information of time proportional to the output current and outputs the information.

7. The temperature measuring device according to claim 3, wherein said parameter determining means calculates A' and B as said parameters that satisfy a relationship:

$$OUT=A'T^2\exp(B/T)$$

where the output value of said current reading means is assumed to be OUT and the temperature of said current source measured by said reference temperature measuring means is assumed to be T.

8. The temperature measuring device according to claim 7, wherein said parameter determining means uniquely determines parameter B from the output value of said current reading means at an arbitrary temperature, and determines parameter A' using an expression indicating a relationship between output value OUT of said current reading means and temperature T of said current source measured by said reference temperature measuring means.

9. The temperature measuring device according to claim 7, wherein said parameter determining means determines parameters A' and B from a first output value of said current reading means at a first temperature and a second output value of said current reading means at a second temperature using an expression indicating a relationship between output value OUT of said current reading means and temperature T of said current source measured by said reference temperature measuring means.

10. A temperature measuring method comprising:
detecting an output current of a current source whose output current varies with a variation in temperature;
outputting a value proportional to the output current;
measuring a temperature of said current source corresponding to the output value proportional to said output current;
determining a parameter for converting the output value to temperature information from said output value and the measured value of the temperature of said current source corresponding to the output value; and
converting said output value to temperature information using said parameter.

11. The temperature measuring method according to claim 10, further comprising a transistor for said current source, wherein the output current of said current source is an off-leakage current of said transistor.

12. The temperature measuring method according to claim 11, wherein a value proportional to the output current of said current source is converted to temperature information using two types of parameter.

13. The temperature measuring method according to claim 12, wherein A' and B that satisfy a relationship:

$$OUT=A'\exp(-BT)$$

are calculated as said parameters where the value proportional to the output current of said current source is assumed to be OUT and a measured value of the temperature of said current source is assumed to be T.

14. The temperature measuring method according to claim 13, wherein parameter B is uniquely determined from the value proportional to the output current of said current source at an arbitrary temperature, and parameter A' is determined using an expression indicating a relationship between output value OUT proportional to the output current of said current source and measured temperature value T of said current source.

15. The temperature measuring method according to claim 13, wherein parameters A' and B are determined from a first value proportional to the output current of said current source at a first temperature and a second value proportional to the output current of said current source at a second temperature using an expression indicating a relationship between output value OUT proportional to the output current of said current source and measured temperature value T of said current source.

16. The temperature measuring method according to claim 12, wherein A' and B that satisfy a relationship:

$$OUT=A'T^2\exp(B/T)$$

are calculated as said parameters where the value proportional to the output current of said current source is assumed to be OUT and a measured value of the temperature of said current source is assumed to be T.

17. The temperature measuring method according to claim 16, wherein parameter B is uniquely determined from the value proportional to the output current of said current source at an arbitrary temperature, and parameter A' is determined using an expression indicating a relationship between output value OUT proportional to the output current of said current source and measured temperature value T of said current source.

18. The temperature measuring method according to claim 16, wherein parameters A' and B are determined from a first value proportional to the output current of said current source at a first temperature and a second value proportional to the output current of said current source at a second temperature using an expression indicating a relationship between output value OUT proportional to the output current of said current source and measured temperature value T of said current source.

19. The temperature measuring method according to claim 10, wherein the value proportional to the output current of said current source is information on time proportional to the output current.

* * * * *